United States Patent
Wada et al.

(10) Patent No.: US 8,340,174 B2
(45) Date of Patent: Dec. 25, 2012

(54) IMAGE PROCESSING DEVICE AND IMAGE PROCESSING METHOD

(75) Inventors: Yuji Wada, Tokyo (JP); Takao Nozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1114 days.

(21) Appl. No.: 12/246,028

(22) Filed: Oct. 6, 2008

(65) Prior Publication Data

US 2009/0135903 A1      May 28, 2009

(30) Foreign Application Priority Data

Nov. 26, 2007   (JP) ............................. P2007-304785

(51) Int. Cl.
    *H04N 7/12*    (2006.01)
(52) U.S. Cl. ......... 375/240.03; 375/240.16; 375/240.24; 375/240.27; 375/240.18; 382/232
(58) Field of Classification Search ............... 375/240, 375/240.03, 240.16, 240.18, 240.12; 382/232
    See application file for complete search history.

(56) References Cited

U.S. PATENT DOCUMENTS

| | | | | |
|---|---|---|---|---|
| 5,926,569 | A * | 7/1999 | Nickerson | 382/232 |
| 6,343,098 | B1 * | 1/2002 | Boyce | 375/240.03 |
| 6,674,897 | B1 | 1/2004 | Sugisaki et al. | |
| 6,895,054 | B2 * | 5/2005 | Li | 375/240.13 |
| 6,925,119 | B2 * | 8/2005 | Bartolucci et al. | 375/240.03 |
| 7,397,852 | B2 | 7/2008 | Sugiyama et al. | |
| 7,916,961 | B2 * | 3/2011 | Mizuno | 382/240 |
| 2003/0012279 | A1 * | 1/2003 | Chaddha | 375/240.12 |
| 2003/0081672 | A1 * | 5/2003 | Li | 375/240.01 |
| 2005/0175089 | A1 * | 8/2005 | Jung | 375/240.03 |
| 2007/0041448 | A1 * | 2/2007 | Miller et al. | 375/240.18 |
| 2007/0110155 | A1 * | 5/2007 | Sung et al. | 375/240.13 |
| 2008/0013844 | A1 * | 1/2008 | Hu | 382/240 |
| 2008/0165105 | A1 * | 7/2008 | Okuda et al. | 345/89 |
| 2009/0010327 | A1 * | 1/2009 | Cheng et al. | 375/240.03 |
| 2009/0074059 | A1 * | 3/2009 | Chang | 375/240.03 |

FOREIGN PATENT DOCUMENTS

JP           07-236138           9/1995
(Continued)

OTHER PUBLICATIONS

Braquelaire J, Comparison and Optimization of methods of color image quantization, Jul. 1997, IEEE, vol. 6, pp. 2-4.*

*Primary Examiner* — Nathan Flynn
*Assistant Examiner* — Viral Lakhia
(74) *Attorney, Agent, or Firm* — Finnegan Henderson Farabow Garrett & Dunner LLP

(57) ABSTRACT

Disclosed herein is an image processing device for coding image data, which is divided by a given pixel count into macroblocks, on a macroblock-by-macroblock basis, the image processing device including: a quantization section configured to quantize image data on a macroblock-by-macroblock basis; a detection section configured to detect a macroblock containing a given color pixel from the image data; and a control section configured to control the quantization section, the control section including a distance calculation section configured to calculate the distance between a given image position in a picture of the image data and an image position in the macroblock detected by the detection section, and a bitrate control section configured to control the quantization section so that a higher bitrate is assigned with decreasing distance calculated by the distance calculation section.

7 Claims, 10 Drawing Sheets

FOREIGN PATENT DOCUMENTS

| | | |
|---|---|---|
| JP | 10-126778 | 5/1998 |
| JP | 2002-238060 | 8/2002 |
| JP | 3569963 | 7/2004 |
| JP | 2005-080151 | 3/2005 |
| JP | 2006-005650 | 1/2006 |
| JP | 3845913 | 9/2006 |
| JP | 3900155 | 1/2007 |

* cited by examiner

MACROBLOCKS SUBJECT TO DETERMINATION AS TO WHETHER SKIN COLOR IS CONTAINED

MACROBLOCKS NOT SUBJECT TO DETERMINATION AS TO WHETHER SKIN COLOR IS CONTAINED

IMAGE PROCESSING DEVICE AND IMAGE PROCESSING METHOD

CROSS REFERENCES TO RELATED APPLICATIONS

The present invention contains subject matter related to Japanese Patent Application JP 2007-304785 filed in the Japan Patent Office on Nov. 26, 2007, the entire contents of which being incorporated herein by reference.

BACKGROUND OF THE INVENTION

1. Field of the Invention

The present invention relates to an image processing device and image processing method for coding image data, which is divided by a given pixel count into macroblocks, on a macroblock-by-macroblock basis.

2. Description of the Related Art

For image data obtained by imaging a human subject, the skin-colored area such as the face attracts the viewer's attention. In the case of image data, therefore, subjective image quality can be improved effectively by improving the image quality of the skin color of the face or other parts of the body.

In order to achieve improved subjective image quality, the existing image processing devices have typically performed skin color detection and assigned a higher bitrate to those macroblocks detected to contain the skin color, thus providing improved image quality.

However, if the skin color is detected in many areas of the screen, a higher bitrate is assigned to the macroblocks detected to contain the skin color. As a result, a sufficiently high bitrate may not be assigned to those macroblocks not detected to contain the skin color. Under such a circumstance, lack of a sufficiently high bitrate that can be assigned to the macroblocks not detected to contain the skin color leads to degraded image quality, resulting in deteriorated image quality as a whole despite improved image quality of the skin color.

Therefore, Japanese Patent Laid-Open No. 2005-80151 (hereinafter referred to as Patent Document 1) proposes a method for maintaining the overall image quality. This method does so by not assigning a higher bitrate to those macroblocks detected to contain the skin color if the number of such macroblocks of all the macroblocks across the screen exceeds a given number.

SUMMARY OF THE INVENTION

The image processing device described in the aforementioned Patent Document 1 repeats a sequence of assigning a higher bitrate to the detected macroblocks at one time and not at another time for successive frames if the number of macroblocks detected to contain the skin color or other given color remains around the given number.

As a result, the same area detected to contain the given color appears beautiful in one frame, but not in the next frame. This variation in image quality along the time axis has led to subject image quality degradation.

The present invention has been made in light of the foregoing. It is desirable to provide an image processing device and image processing method for assigning a higher bitrate to the macroblocks detected to contain the given color while at the same time suppressing the frequency of variation in image quality along the time axis.

The image processing device according to an embodiment of the present invention codes image data, which is divided by a given pixel count into macroblocks, on a macroblock-by-macroblock basis. The image processing device includes quantization means adapted to quantize image data on a macroblock-by-macroblock basis. The image processing device further includes detection means adapted to detect a macroblock containing a given color pixel from the image data. The image processing device still further includes control means adapted to control the quantization means. The control means includes distance calculation means adapted to calculate the distance between a given image position in a picture of the image data and an image position in the macroblock detected by the detection means. The control means further includes bitrate control means adapted to control the quantization means so that a higher bitrate is assigned with decreasing distance calculated by the distance calculation means.

Further, the image processing method according to an embodiment of the present invention codes image data, which is divided by a given pixel count into macroblocks, on a macroblock-by-macroblock basis. The image processing method includes a detection step of detecting a macroblock containing a given color pixel from the image data. The image processing method further includes a distance calculation step of calculating the distance between a given image position in a picture of the image data and an image position in the macroblock detected by the detection step. The image processing method further includes a control step of controlling the quantization of the image data so that a higher bitrate is assigned with decreasing distance calculated by the distance calculation step.

Further, the image processing device according to an embodiment of the present invention further includes imaging means adapted to obtain image data. The quantization means quantizes the image data obtained by the imaging means.

The present invention controls the quantization of image data so that a higher bitrate is assigned with decreasing distance between a given image position and an image position in the macroblock detected to contain a given color pixel. As a result, the present invention does not assign a higher bitrate to the macroblocks far away from the given image position of all the macroblocks containing the given color even if many macroblocks contain the given color across the screen. This ensures less frequent variation in image quality along the time axis, thus providing improved subjective image quality.

Further, the present invention determines whether each of the macroblocks is Located within a given image area, thus detecting those macroblocks containing the given color pixel from among all the macroblocks located within the given image area. This suppresses the difference in image quality at the boundary of the given area and ensures even less frequent variation of the image quality along the time axis, thus providing improved subjective image quality.

DETAILED DESCRIPTION OF THE PREFERRED EMBODIMENTS

The image processing device, to which the present invention is applied, codes image data, which is divided by a given pixel count into macroblocks, on a macroblock-by-macroblock basis. In the embodiments described below, an image processing device, and more specifically an imaging device 51 as illustrated in FIG. 1, will be used for the description.

Figure 1:
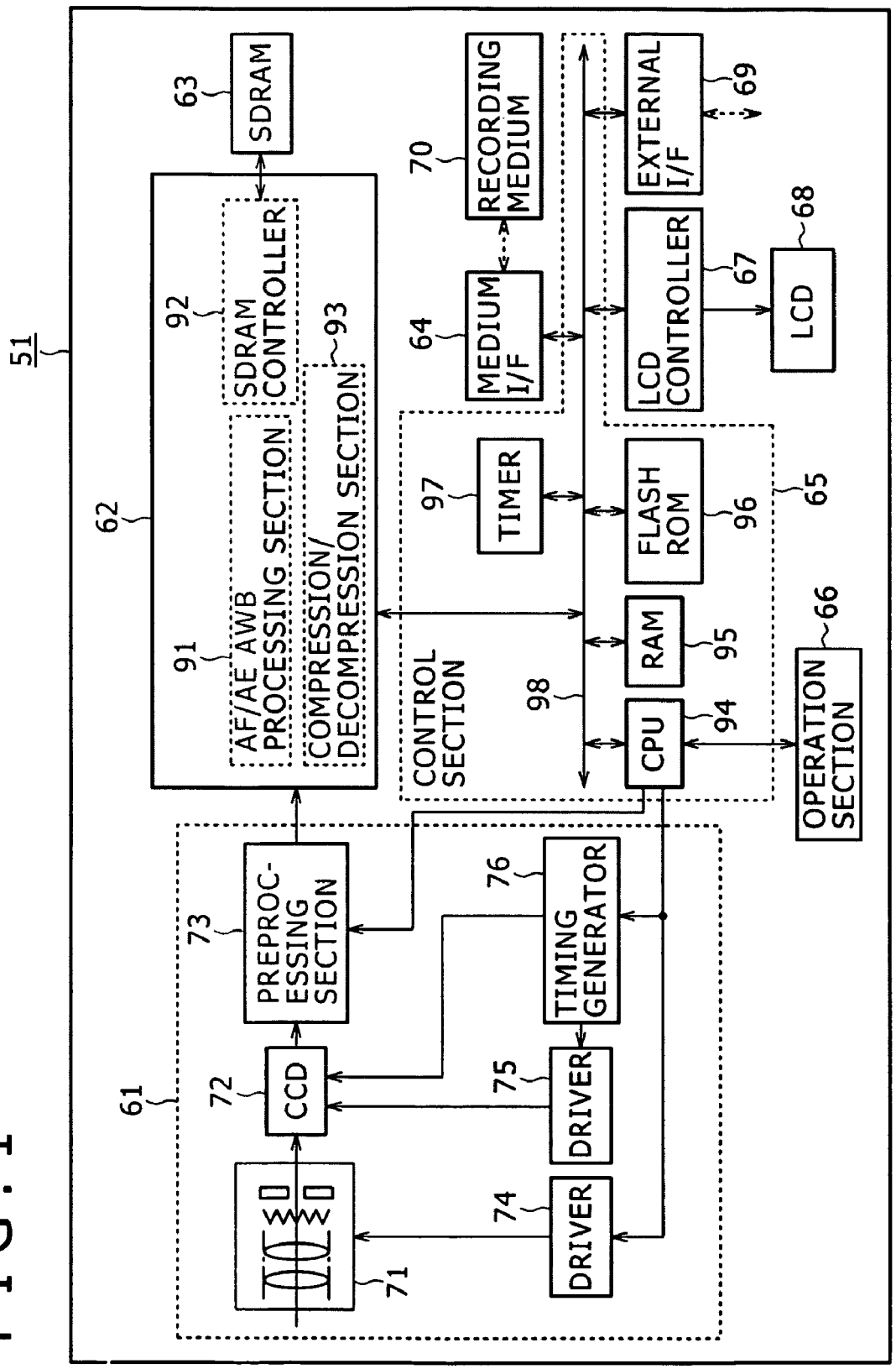
FIG. 1 is a block diagram illustrating the configuration of an image processing device to which the present invention is applied.

As illustrated in FIG. 1, the imaging device 51 includes a camera section 61, camera DSP (Digital Signal Processor) 62, SDRAM (Synchronous Dynamic Random Access Memory) 63, and medium interface (hereinafter referred to as medium I/F) 64. The same device 51 further includes a control section 65, operation section 66, LCD (Liquid Crystal Display) controller 67, LCD 68 and external interface (hereinafter referred to as external I/F) 69. A recording medium 70 is attachable to and detachable from the medium I/F 64.

A semiconductor memory is used as the recording medium 70. Such a memory includes a so-called memory card, optical recording medium such as recordable/reproducible DVD (Digital Versatile Disk) and magnetic disk.

The camera section 61 includes an optical block 71, CCD (Charge Coupled Device) 72, preprocessing section 73, optical block driver 74, CCD driver 75 and timing generator 76. Here, the optical block 71 includes a lens, focusing mechanism, shutter mechanism and iris mechanism to control light incident onto the CCD 72.

The optical block driver 74 generates, during imaging, a drive signal adapted to activate the optical block 71 based on control by the control section 65 and supplies the signal to the optical block 71. The optical block 71 drives, based on the drive signal from the driver 74, the focusing, shutter and iris mechanisms to load the subject image and supplies the image to the CCD 72.

The timing generator 76 generates a timing signal representing a given timing in response to control by the control section 65 and supplies the signal to the CCD 72 and to the driver 75 adapted to drive the CCD 72. On the other hand, the driver 75 generates, based on the timing signal from the timing generator 76, a drive signal and supplies the signal to the CCD 72.

The CCD 72 is designed to convert light (i.e., image) from the optical block 71 into an electric signal and output the converted signal. The CCD 72 is activated in response to the drive signal from the CCD driver 75 to load the subject image from the optical block 71. The CCD 72 also supplies, based on the timing signal from the timing generator 76 controlled by the control section 65, the loaded subject image (image information) to the preprocessing section 73 in the form of an electric signal.

The preprocessing section 73 performs CDS (Correlated Double Sampling) on the supplied image information in the form of an electric signal to maintain the S/N (Signal/Noise) ratio at an appropriate level. The same section 73 further performs AGC (Automatic Gain Control) on the image information to control the gain. The same section 73 still further performs A/D (analog/digital) conversion to convert the analog signal into a digital image signal and supplies the digital image signal to the camera DSP 62.

On the other hand, the control section 65 is a microcomputer adapted to control all the sections of the imaging device 51. The control section 65 includes a CPU (Central Processing Unit) 94, RAM (Random Access Memory) 95, flash ROM (Read Only Memory) 96 and timer 97 which are connected with each other via a system bus 98.

Here, the RAM 95 is used primarily as a work area to temporarily store the results halfway through the process. The ROM 96 stores various programs executed by the CPU 94 and data requisite for the process. The timer 97 can supply not only the current date, day of the week and time but also the dates of imaging and other information.

The camera DSP 62 performs AF (Auto Focus), AE (Auto Exposure) and AWB (Auto White Balance) and other camera signal processing on the image data supplied from the preprocessing section 73 using an AF/AE/AWB processing section 91. A compression/decompression section 93 compresses the supplied processed data according to a given compression scheme using a coding section 100 which will be described later. To do so, the same section 93 uses the SDRAM 63 connected via an SDRAM controller 92 as a main memory. The compressed data is supplied to the recording medium 70 attached to the medium I/F 64 via a system bus 98.

On the other hand, of the image data recorded in the recording medium 70, the user's desired piece of image data is read in response to an operational input from the user received via the operation section 66 which includes a touch panel, control keys and so on. The data is supplied to the camera DAP 62 via the medium I/F 64 and system bus 98.

The camera DAP 62 decompresses the compressed image data read from the recording medium 70 and supplied via the medium I/F 64 using the compression/decompression section 93. The camera DAP 62 supplies the decompressed image data to the LCD controller 67 via the system bus 98. The LCD controller 67 generates an image signal to be supplied to the LCD 68 from the supplied image data and supplies the image signal to the LCD 68 for display. This allows the image associated with the image data recorded in the recording medium 70 to be displayed on the screen of the LCD 68.

It should be noted that the image is displayed, for example, based on the display program recorded in the flash ROM 96.

Further, the imaging device 51 has the external I/F 69. The same device 51 is, for example, connected to an unshown external computer via the external I/F 69. The same device 51 receives image data from the computer and records the image data to the recording medium 70 attached to the medium I/F 64. The same device 51 also supplies the image data recorded in the recording medium 70 attached to the medium I/F 64 to the external computer or other equipment.

Still further, if a connection module is connected to the external I/F 69, the imaging device 51 connects to the Internet or other network and acquires various pieces of image data or other information via the network. The same device 51 records the acquired data to the recording medium 70. The same device 51 also transmits the image data recorded in the recording medium 70 attached to the medium I/F 64 to the intended party via the network.

Still further, image data or other information acquired via the external computer and network and recorded in the recording medium 70 attached to the medium I/F 64 can be displayed on the LCD 68 for viewing by the user in the same manner as described above.

It should be noted that a wired interface such as IEEE (Institute of Electrical and Electronics Engineers) 1394 or USB (Universal Serial Bus) or wireless interface using light or radio wave can be provided as the external I/F 69. That is, the external I/F 69 may be a wired or wireless interface.

As described above, the imaging device 51 can image a subject and record the subject image to the recording medium 70 attached to the medium I/F 64. The same device 51 can further read the image data from the recording medium 70 and reproduce the image data for use. The same device 51 can still further receive image data via an external computer or network and record the image data to the recording medium 70 or read the image data from the recording medium 70 for reproduction.

Figure 2:
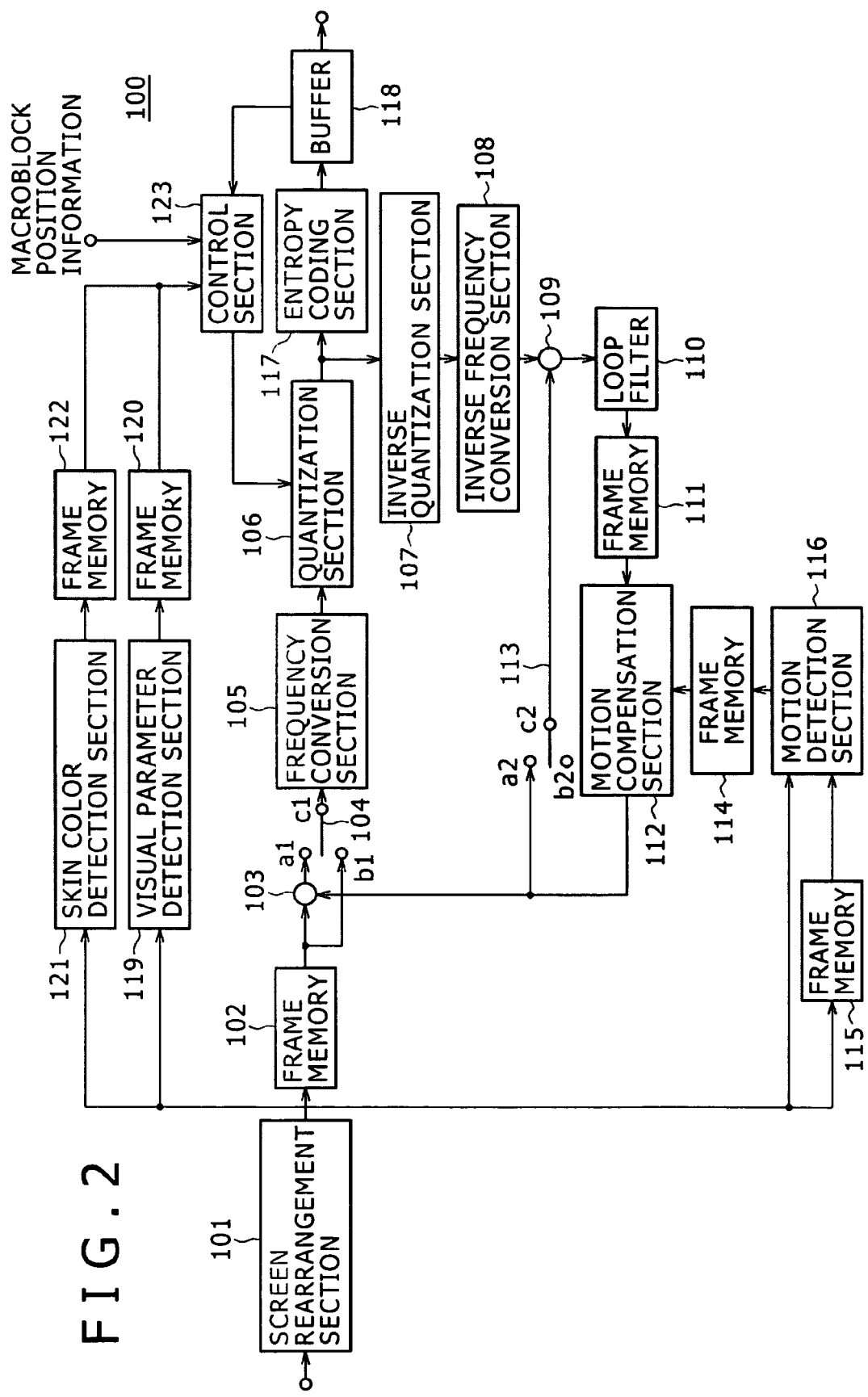
FIG. 2 is a block diagram illustrating a coding section according to a first embodiment.

A description will be given below of the coding section 100 as illustrated in FIG. 2 with focus on its configuration and operation. The coding section 100 is an example of coding device to which the present invention is applied. The same device 100 is incorporated in the compression/decompression section 93 of the imaging device 51.

The coding section 100 includes, as an image processing system adapted to code ordinary image data, a screen rearrangement section 101, frame memory 102, calculator 103, switch-over section 104, frequency conversion section 105, quantization section 106 and inverse quantization section 107. The same section 100 further includes an inverse frequency conversion section 108, calculator 109, loop filter 110, frame memory 111, motion compensation section 112, switch-over section 113, frame memories 114 and 115, motion detection section 116, entropy coding section 117 and buffer 118.

Further, the coding section 100 includes, as a control system adapted to primarily control the operation of the quantization section 106 of all the aforementioned sections in the image processing system, a visual parameter detection section 119, frame memory 120, skin color detection section 121, frame memory 122 and control section 123.

The screen rearrangement section 101 rearranges the pictures of the input video signal from display order to coding order according to the GOP (Group of Picture) structure. The same section 101 supplies the rearranged pictures to the frame memory 102, frame memory 115, motion detection section 116, visual parameter detection section 119 and skin color detection section 121.

The frame memory 102 delays the pictures supplied from the screen rearrangement section 101 by the time requisite for the visual parameter detection section 119 and skin color detection section 121 to process one picture. This process will be described later. Then, the same memory 102 outputs the pictures to the calculator 103 and a terminal b1 of the switch-over section 104.

The motion detection section 116 calculates the motion vector of the macroblock, obtained by dividing the image data by a given pixel count, based on the macroblock-by-macroblock image data from the screen rearrangement section 101 and reference image data stored in the frame memory 115. The same section 116 supplies the calculated motion vector as the motion vector data to the frame memory 114. The motion vector is delayed by one picture in the frame memory 114 and then supplied to the motion compensation section 112.

In the coding section 100, when a macroblock to be intraframe-coded is output from the frame memory 102, the switch-over section 104 connects the terminal b1 and a terminal c1 together. That is, in the coding section 100, the macroblock to be intraframe-coded is supplied directly to the frequency conversion section 105 without being supplied to the calculator 103.

The frequency conversion section 105 orthogonally transforms the macroblock supplied via the switch-over section 104 and supplies orthogonal transform coefficient data to the quantization section 106.

The quantization section 106 quantizes the orthogonal transform coefficient data from the frequency conversion section 105 based on a quantization value supplied from the control section 123 which will be described later. The same section 106 supplies the quantized orthogonal transform coefficient data to the entropy coding section 117 and inverse quantization section 107. Here, the quantization section 106 adjusts the quantization step size for the quantization according to the quantization value from the control section 123 to control the bitrate.

The inverse quantization section 107 inversely quantizes the quantized orthogonal transform coefficient data from the quantization section 106 using the same quantization step size as used by the quantization section 106. The same section 107 supplies the inversely quantized orthogonal transform coefficient data to the inverse frequency conversion section 108.

The inverse frequency conversion section 108 inversely orthogonally transforms the orthogonal transform coefficient data from the inverse quantization section 107 and supplies the generated image data to the calculator 109. Here, when the macroblock is intraframe-coded in the coding section 100, terminals b2 and c2 are connected together by the switch-over section 113. As a result, the image data supplied to the calculator 109 is stored as is in the frame memory 111 via the loop filter 110 as the reference image data.

On the other hand, when a macroblock to be interframe-prediction-coded is output from the frame memory 102 in forward or bidirectional prediction mode in the coding section 100, the switch-over section 104 connects terminals a1 and c1 together. That is, the macroblock to be interframe-prediction-coded is supplied to the calculator 103 in the coding section 100.

In forward prediction mode, the motion compensation section 112 shifts the read address of the frame memory 114 according to the motion vector data, reads the reference image data indicated by the read address and outputs the read data as the forward prediction image data. Further, in forward prediction mode, the switch-over section 113 connects a terminal a2 and the terminal c2 together and supplies the forward prediction image data to the calculators 103 and 109.

The calculator 103 subtracts the forward prediction image data from the macroblock supplied from the frame memory 102 to obtain difference data as a prediction remainder. The calculator 103 supplies the difference data to the frequency conversion section 105.

The frequency conversion section 105 orthogonally transforms the difference data, supplied from the calculator 103 via the switch-over section 104, into an orthogonal transform coefficient. The same section 105 supplies the orthogonal transform coefficient to the quantization section 106 as orthogonal transform coefficient data.

The quantization section 106 quantizes the orthogonal transform coefficient data from the frequency conversion section 105 based on the quantization value from the control section 123. The same section 106 supplies the quantized orthogonal transform coefficient data to the entropy coding section 117 and inverse quantization section 107.

The inverse quantization section 107 inversely quantizes the quantized orthogonal transform coefficient data from the quantization section 106 using the same quantization step size as used by the quantization section 106. The same section 107 supplies the inversely quantized orthogonal transform coefficient data to the inverse frequency conversion section 108.

The inverse frequency conversion section 108 inversely orthogonally transforms the orthogonal transform coefficient data from the inverse quantization section 107 and supplies the generated difference data to the calculator 109.

The calculator 109 is supplied with forward prediction image data from the motion compensation section 112. The calculator 109 adds the forward prediction image data to the difference data from the inverse frequency conversion section 108 to locally reproduce the reference image data and store the data in the frame memory 111.

In bidirectional prediction mode, on the other hand, the motion compensation section 112 shifts the read address of the frame memory 114 according to the motion vector data, reads the reference image data indicated by the read address and outputs the read data as the bidirectional prediction image data. In bidirectional prediction mode, the switch-over section 113 connects the terminals a2 and c2 together and supplies the bidirectional prediction image data to the calculators 103 and 109.

The calculator 103 subtracts the bidirectional prediction image data from the macroblock-level image data supplied from the frame memory 102 to obtain difference data as a prediction remainder. The calculator 103 supplies the difference data to the frequency conversion section 105.

The frequency conversion section 105 orthogonally transforms the difference data, supplied from the calculator 103 via the switch-over section 104, into an orthogonal transform coefficient. The same section 105 supplies the orthogonal transform coefficient to the quantization section 106 as orthogonal transform coefficient data.

The quantization section 106 quantizes the orthogonal transform coefficient data from the frequency conversion section 105 based on the quantization value from the control section 123. The same section 106 supplies the quantized orthogonal transform coefficient data to the entropy coding section 117 and inverse quantization section 107.

The inverse quantization section 107 inversely quantizes the quantized orthogonal transform coefficient data from the quantization section 106 using the same quantization step size as used by the quantization section 106. The same section 107 supplies the inversely quantized orthogonal transform coefficient data to the inverse frequency conversion section 108.

The inverse frequency conversion section 108 inversely orthogonally transforms the orthogonal transform coefficient data from the inverse quantization section 107 and supplies the generated difference data to the calculator 109.

The calculator 109 is supplied with bidirectional prediction image data from the motion compensation section 112. The calculator 109 adds the bidirectional prediction image data to the difference data from the inverse frequency conversion section 108 to locally reproduce the reference image data and store the data in the frame memory 111.

The image data, stored in the frame memory 102 according to the intraframe coding or interframe prediction coding as described above, is subjected to the aforementioned motion compensation prediction, orthogonal transform and quantization on a macroblock-by-macroblock basis. The resultant data is supplied to the entropy coding section 117 as quantized orthogonal transform coefficient data.

The entropy coding section 117 variable-length-codes the quantized orthogonal transform coefficient data from the quantization section 106 based on a given conversion table. The same section 117 supplies the variable-length-coded data to the buffer 118.

The buffer 118 buffers the variable-length-coded data from the entropy coding section 117, smoothes the transmission rate and outputs the data externally from the coding section 100.

The visual parameter detection section 119 calculates an activity act using the pixel values of a total of eight (8) submacroblocks and also using formulas (1) to (3) shown below. Of the eight submacroblocks, the four (4) are obtained by dividing the macroblock for orthogonal transform of the image data on a frame-by-frame basis, and the remaining four by dividing the macroblock for orthogonal transform of the image data on a field-by-field basis. The same section 119 supplies the activity act to the frame memory 120.

$$P = \frac{1}{64} \cdot \sum_{k=1}^{64} Pk \qquad (1)$$

$$\mathrm{var}\, sblk = \frac{1}{64} \cdot \sum_{k=1}^{64} (Pk - P)^2 \qquad (2)$$

$$act = 1 + \min(\mathrm{var}\, sblk) \qquad (3)$$

Here, Pk is the pixel value of the brightness signal. min (var sblk) is the minimum var sblk value of the eight submacroblocks. The minimum value is taken in formula (3) because a fine quantization is required even if only part of the macroblock is flat. Using these formulas, the activity act represents the flatness of the brightness signal in the macroblock.

Figure 3:
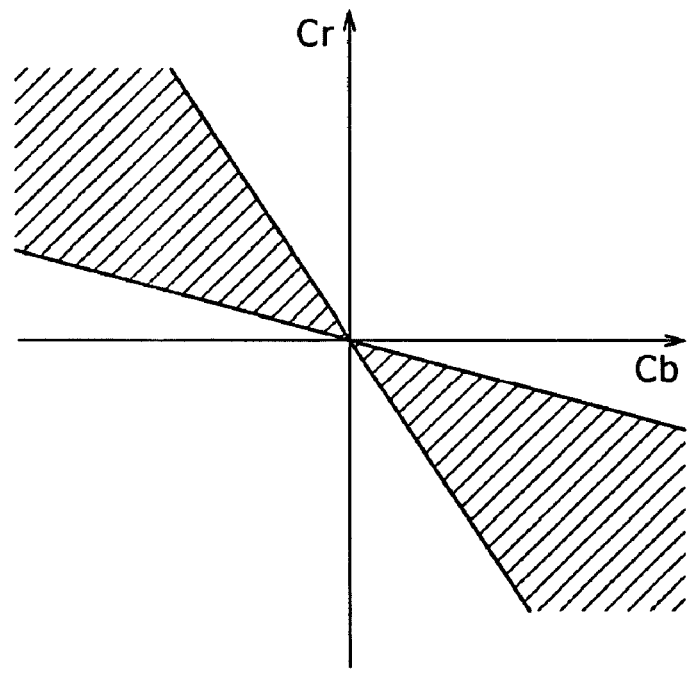
FIG. 3 is a diagram for describing the skin color detection.

The skin color detection section 121 detects the skin color pixels in the image data from the screen rearrangement section 101 on a macroblock-by-macroblock basis. That is, the same section 121 detects whether color difference signal levels Cb and Cr of each piece of the pixel data of the macroblock are located in a specific area shown by oblique lines in FIG. 3. If the color difference signal levels Cb and Cr of the image data are located in the specific area, the skin color detection section 121 determines that the pixel is a skin color pixel. If at least one skin color pixel is contained in a macroblock, the same section 121 considers the macroblock to be a skin color macroblock. The same section 121 supplies the skin color macroblock detection result to the frame memory 122 as a skin color detection signal.

The frame memory 122 delays the skin color macroblock detection result by the time requisite to process one picture and then supplies the result to the control section 123.

The control section 123 calculates the quantization scale using the usage of the buffer 118, the visual parameter (activity), output from the visual parameter detection section 119 and supplied after being delayed by the frame memory 120, and the skin color detection signal from the frame memory 122.

More specifically, the control section 123 assigns a higher bitrate to the skin color macroblocks which are important in terms of image quality and detected by the skin color detection section 121. Therefore, the same section 123 controls the quantization section 106 so that the quantization scale for the skin color macroblocks is smaller than that for other macroblocks.

Here, we assume that there are a number of macroblocks containing the skin color across the screen. If a higher bitrate is simply assigned to the macroblocks detected to contain the skin color, the image quality across the screen will significantly deteriorate. To prevent such a deterioration, if the number of macroblocks detected to contain the skin color exceeds a given number, it is possible to prevent the assignment of a higher bitrate to the detected macroblocks. In this case, however, a sequence is repeated in which a higher bitrate is assigned to the detected macroblocks at one time and not at another time if the number of macroblocks detected to contain a given color remains around the given number. This gives rise to varying image quality along the time axis.

Figure 4:
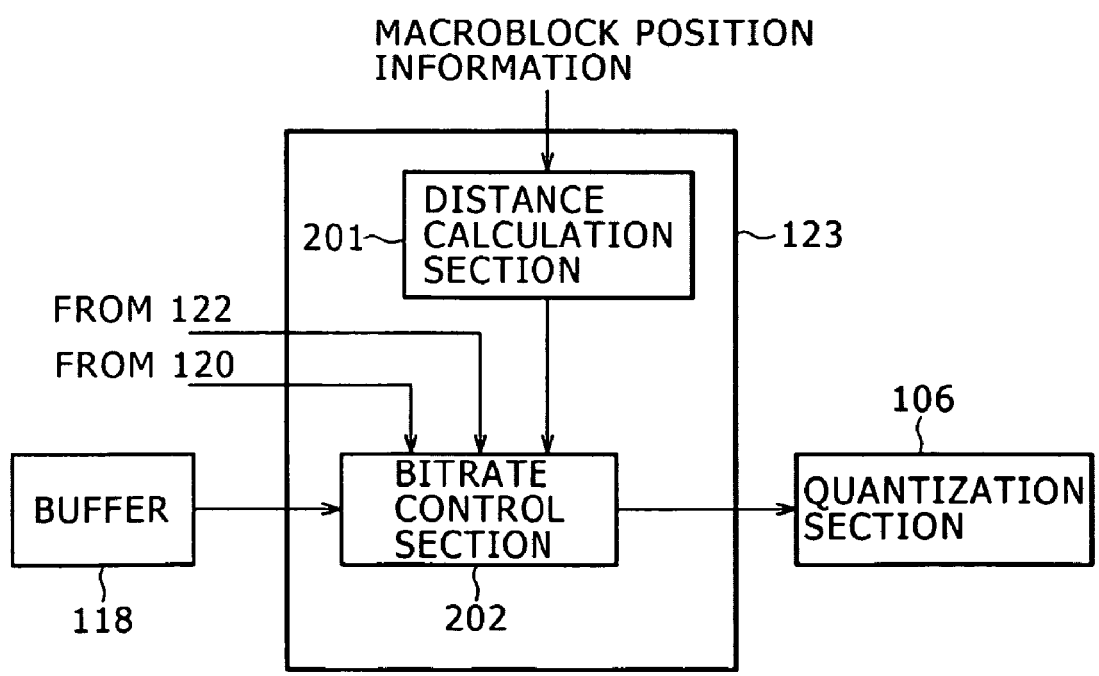
FIG. 4 is a block diagram illustrating a control section according to the first embodiment.

Therefore, the control section 123 is configured as illustrated in FIG. 4. That is, the same section 123 controls the quantization section 106 so that a higher bitrate is assigned to the macroblocks detected to contain the skin color while at the same time suppressing the frequency of variation in image quality along the time axis, based on the macroblock position information indicating the image position in the picture of the macroblock of interest.

That is, the control section 123 includes a distance calculation section 201 and bitrate control section 202 as illustrated in FIG. 4.

The distance calculation section 201 calculates the distance between the given image position in the picture and the image position in the macroblock of interest to be currently processed, based on macroblock image position information. The same section 201 supplies this distance information to the bitrate control section 202. Here, the macroblock image position information is the information indicated by the macroblock read address output from the frame memory 102. More specifically, this information indicates the image position in the macroblock in the picture to be currently processed.

On the other hand, the image in the picture is suitably located, for example, at the center of the screen. The reason for this is that a human subject is typically often imaged so that it is at the center of the screen. In this case, the macroblocks detected to contain the skin color, whose subjective image quality should be improved, are frequently located at the center of the screen.

The bitrate control section 202 controls the quantization section 106. The same section 202 does so according to the distance information calculated by the distance calculation section 201, so that a higher bitrate is assigned to the macroblocks detected to contain the skin color with decreasing distance, calculated by the distance calculation section 201, between a given image position and an image position in the macroblock detected to contain a given color pixel. Here, a description will be given first of the calculation of the quantization scale for the quantization of the macroblocks not detected to contain the skin color prior to the description of control of the quantization section 106 according to the distance information.

That is, the control section 123 calculates, using formulas (4) to (6) shown below, the quantization scale according to the usage of the buffer 118 and the activity act output from the visual parameter detection section 119 and supplied after being delayed by the frame memory 120. The same section 123 controls the operation of the quantization section 106 according to the quantization scale.

That is, a constant r shown in formula (4) is substituted into formula (5) to calculate the quantization index. A fine quantization is demanded for the flat area where the deterioration is visually conspicuous, and a coarse quantization for the elaborately patterned area where the deterioration is not readily conspicuous, in consideration of the correlation between the macroblock-to-macroblock activities across the screen. To achieve this, the bitrates to be assigned are moved from the macroblocks with a relatively high activity to those with a relatively low activity so that the bitrates across the screen are concentrated on the relatively flat macroblocks, thus providing improved image quality of the flat macroblocks.

$$r=2(\text{bit\_rate}/\text{picture\_rate}) \qquad (4)$$

$$Qj=(31/r) \times dj \qquad (5)$$

$$q\text{scale}=Qj \times (2\text{act}+\text{avg\_act})/(\text{act}+2\text{avg\_act}) \qquad (6)$$

Here, bit_rate is the bitrate, picture_rate the picture rate, Qj the quantization scale of the jth macroblock, dj the buffer occupancy at the time of coding of the jth macroblock, act the activity of the jth macroblock and avg_act the average activity of the macroblocks coded in the past. It should be noted that the term "jth" is the address number of the macroblock of interest to be currently processed.

A description will be given next of the calculation of the quantization scale for the quantization of the macroblock detected to contain the skin color. That is, the control section 123 calculates the quantization scale Qj described above using formulas (4) and (5). The same section 123 also calculates the quantization scale qscale using formulas (7) to (9) shown below.

$$q\text{scale}=Qj(f(d) \times \text{mact}+\text{avg\_mact})/\text{mact}+f(d) \times \text{avg\_mact} \qquad (7)$$

$$\text{mact}=\text{act}/m \qquad (8)$$

$$\text{avg\_mact}=\text{avg\_act}/m \qquad (9)$$

Here, m is a positive number equal to or greater than 1 and a constant found experimentally or empirically, mact is the activity of the jth macroblock modulated by formula (8), and avg_mact the value obtained by modulating the average activity of the macroblocks coded in the past using formula (9). avg_mact will be hereinafter referred to as the average modulation activity.

Further, f(d) is a monotonically decreasing function with respect to a variable d which is the distance calculated by the distance calculation section 201. f(d) is expressed as shown below in formula (10).

$$f(d)=(B-C \times d)/A \qquad (10)$$

where A, B and C are positive constants.

For a macroblock determined to be a skin color macroblock, if f(d) is set to 2, which is equal to the coefficient associated with formula (6), mact becomes smaller than act. As a result, the quantization scale qscale also becomes smaller. This allows for coding to be performed with a smaller-than-normal quantization scale, thus providing improved image quality of the skin color area.

As described above, the bitrate control section 202 sets f(d) so that a higher bitrate is assigned to the macroblocks detected to contain a skin color pixel with decreasing distance calculated by the distance calculation section 201, thus calculating the quantization scale qscale.

Figure 5A:
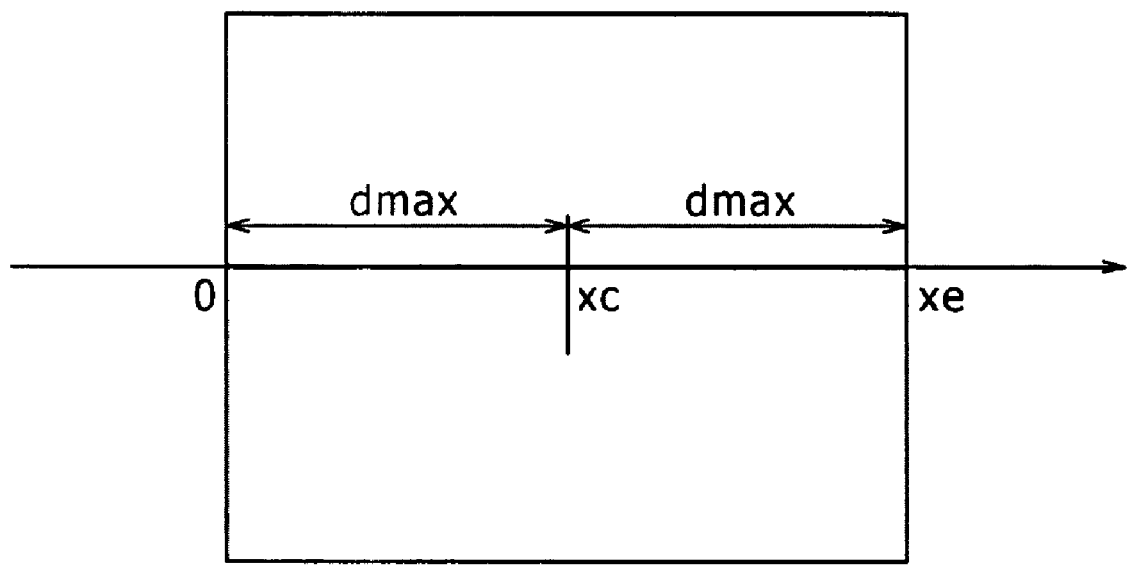
FIGS. 5A and 5B are diagrams for describing the quantization scale calculation using a bitrate control section.
Figure 5B:
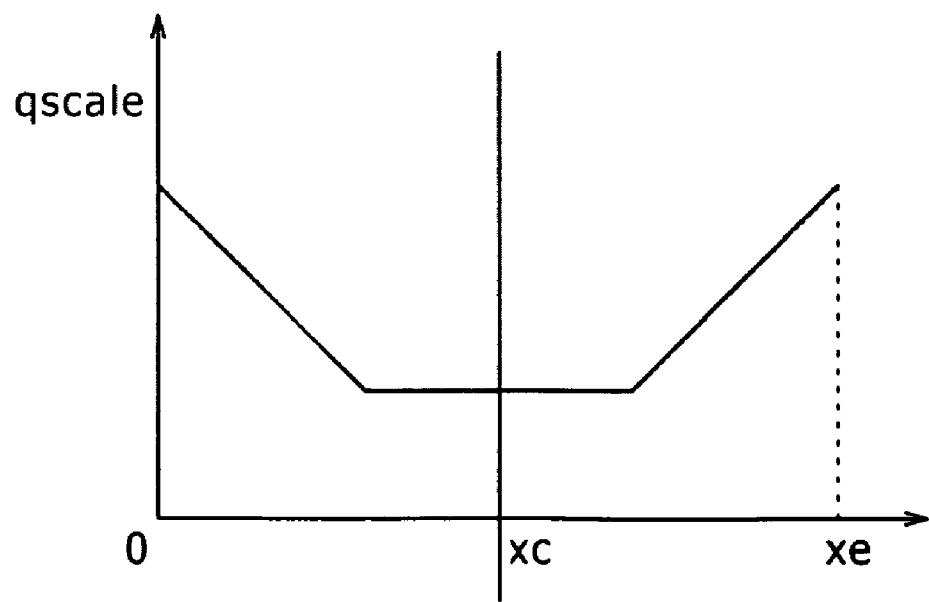

More specifically, the bitrate control section 202 sets the f(d) characteristics as follows as illustrated in FIGS. 5A and 5B. That is, the f(d) characteristics are set so that the quantization scale is relatively small for the macroblocks detected to contain the skin color near a screen center xc and so that the quantization scale for the macroblocks detected to contain the skin color becomes closer to that for the macroblocks not detected to contain the skin color with increasing distance from the screen center xc.

Here, FIG. 5A illustrates a maximum distance dmax from the center xc to the left and right ends, with the horizontal axis representing a displacement x from the left end of the screen. FIG. 5B illustrates the change of the quantization scale qscale relative to the displacement x.

Here, the quantization scale qscale can be expressed as shown below in formula (11) from formulas (7) to (9).

$$qscale = Qj(f(d) \times act/m + avg\_mact)/(act/m + f(d) \times avg\_act/m) \quad (11)$$

Hence, the bitrate control section 202 sets the characteristics of the function f(d) so that the function monotonically decreases with respect to the variable d to fall, for example, within the range of $2 \leq f(d)/m \leq 4$. This ensures that the quantization scale is relatively small for the macroblocks detected to contain the skin color near the screen center xc and that the quantization scale for the macroblocks detected to contain the skin color becomes closer to that for the macroblocks not detected to contain the skin color with increasing distance from the screen center xc.

If the f(d) characteristics are set as described above, the bitrate control section 202 calculates the quantization scale qscale of the macroblock whose d is 0 based on the macroblock position information and which is detected to contain the skin color, i.e., the macroblock located at the screen center and detected to contain the skin color. The same section 202 calculates the quantization scale using formula (12) shown below by setting f(d)/m to 4.

$$qscale = Qj(4 \times act + avg\_mact)/mact + 4 \times avg\_act \quad (12)$$

Figure 6:
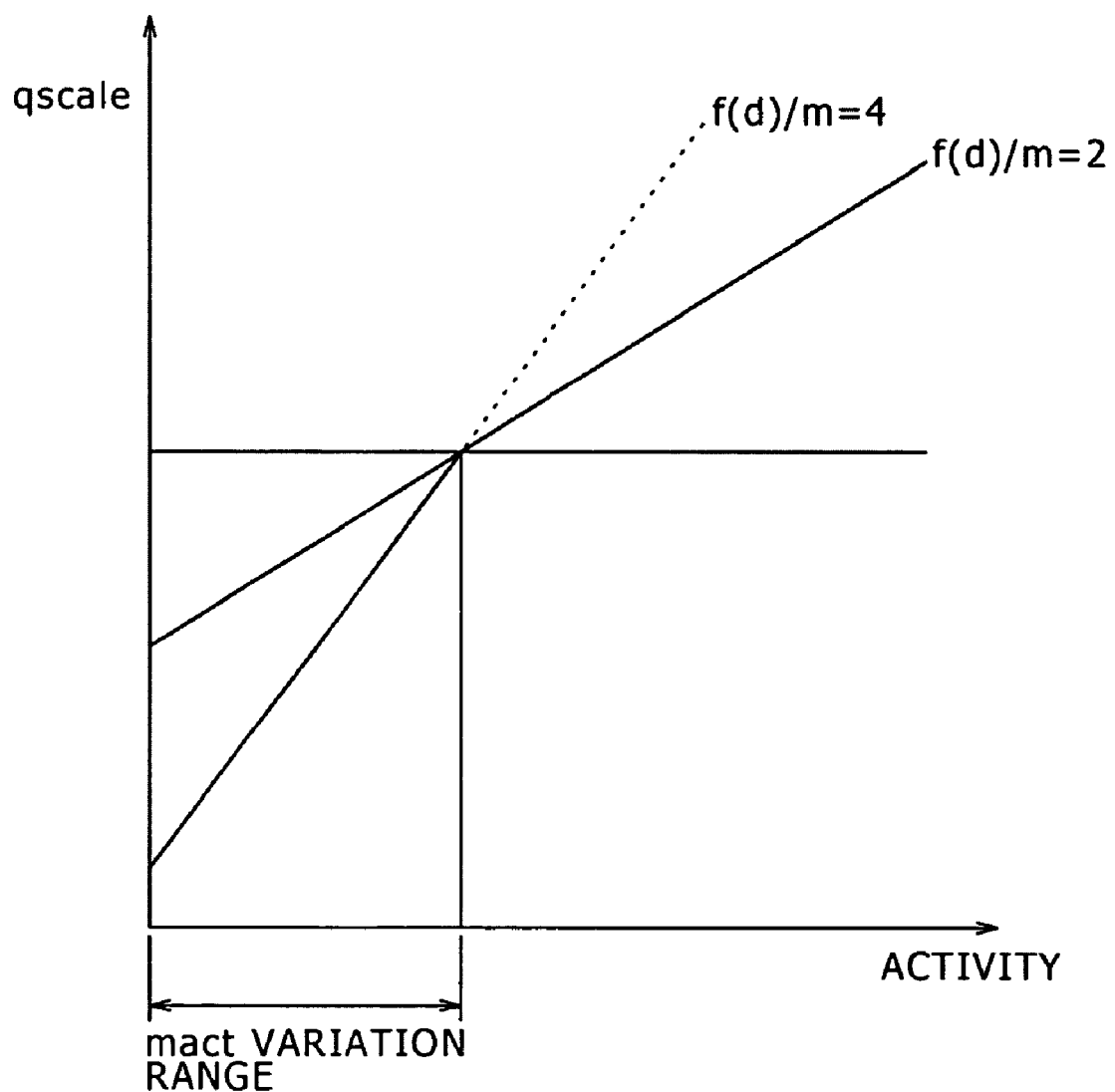
FIG. 6 is a diagram for describing the quantization scale calculation performed on a macroblock detected to contain the skin color.

Using formula (12), the bitrate control section 202 reduces the quantization scale qscale with the decreasing activity act as illustrated in FIG. 6. Here, if formula (12) is used, the rate of change of the quantization scale qscale relative to the activity act is large. However, the activity act of the macroblocks detected to contain the skin color changes to a smaller extent as compared to that of the macroblocks not detected to contain the skin color. This makes it possible to reduce the quantization scale qscale with the decreasing activity act.

As described above, the bitrate control section 202 reduces the quantization scale qscale for those macroblocks with a small activity and located at a short distance from the screen center of all the macroblocks determined to be skin color macroblocks, thus providing improved image quality. This means, in the case of a human face, that a higher bitrate is assigned to the flat areas such as the cheeks than the areas with many elevated portions such as the nose. This provides visually preferable image.

It should be noted that the bitrate control section 202 changes the quantization scale qscale according to the activity act so that f(d)/m is 2 when d=dmax. The same section 202 does so without making distinction between the macroblocks detected to contain the skin color and those not detected to contain the skin color.

Figure 7:
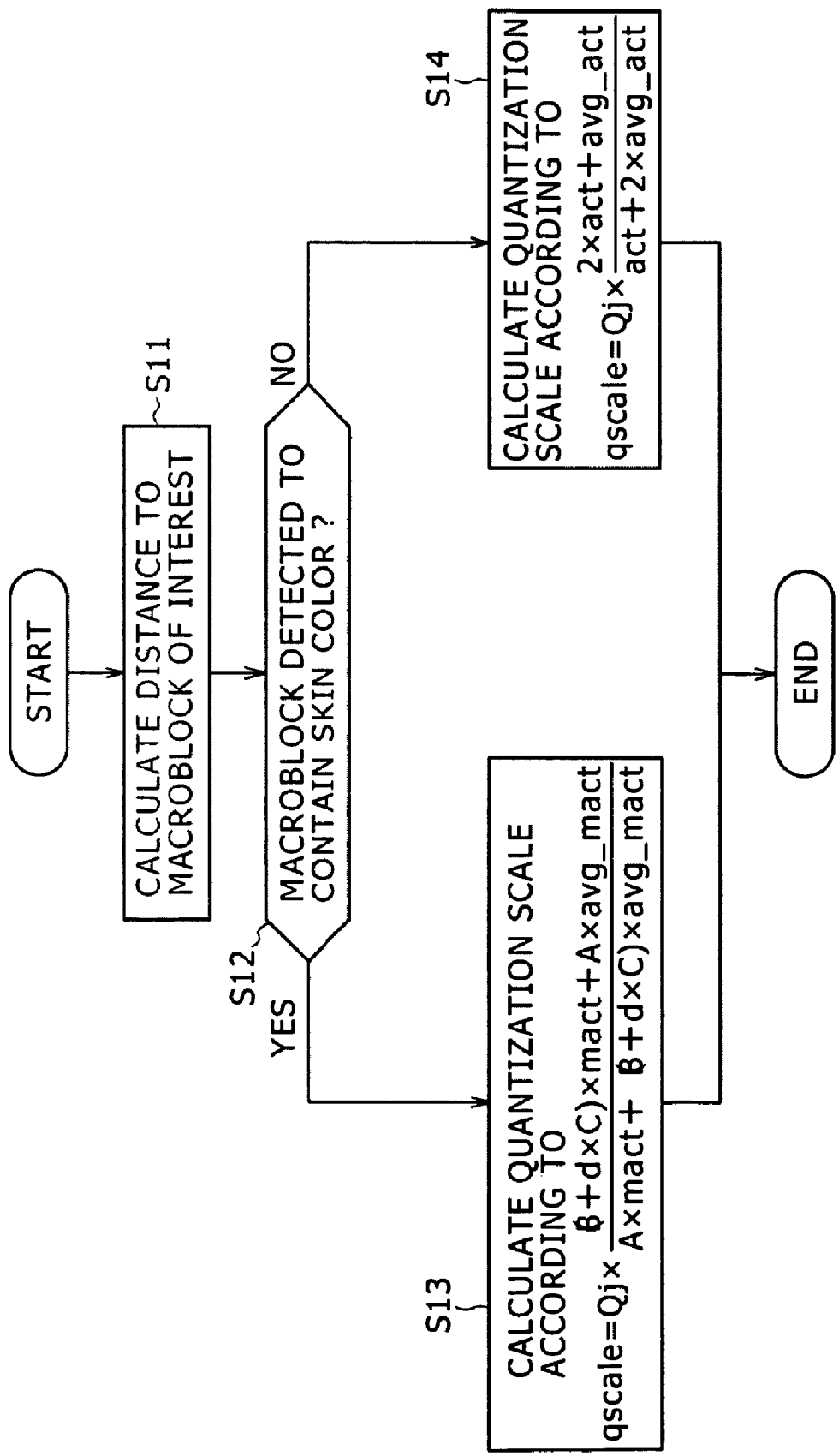
FIG. 7 is a flowchart used to describe a quantization scale calculation step performed by the control section according to the first embodiment.

A description will be given next of the calculation of the quantization scale performed by the control section 123 with reference to the flowchart in FIG. 7. It should be noted that we assume, as prerequisites for this calculation, that the distance calculation section 201 is supplied with macroblock position information, and the bitrate control section 202 with the current usage of the buffer 118, activity act of the macroblock of interest and skin color detection signal indicating whether the macroblock of interest is detected to contain the skin color.

In step S11, the distance calculation section 201 calculates, based on the macroblock image position information, the distance between the given image position in the picture and the image position of the macroblock of interest to be currently processed. Then, the process proceeds to step S12.

In step S12, the bitrate control section 202 determines, according to the skin color detection information, whether the macroblock of interest has been detected to contain the skin color. If so, the process proceeds to step S13. If not, the process proceeds to step S14.

In step S13, the bitrate control section 202 calculates the quantization scale qscale of the macroblock of interest according to formulas (7) to (9) and terminates the process.

In step S14, the bitrate control section 202 calculates the quantization scale qscale of the macroblock of interest according to formulas (4) to (6) and terminates the process.

As described above, in the coding section 100, the control section 123 controls the quantization scale of the quantization section 106 so that a higher bitrate is assigned to the macroblock containing the given color pixel with decreasing distance to the given image position in the picture.

Thanks to the above process performed by the control section 123, a higher bitrate is not assigned to the macroblocks far from the given image position in the coding section 100 even if there are many macroblocks containing a given color across the screen. This provides improved subjective image quality of the image data to be coded while at the same time suppressing the frequency of variation in image quality along the time axis.

This means that even if a sequence is repeated in which the macroblocks far from the given image position are detected to contain the skin color at one time and not at another time, the bitrate is determined in the same manner as for the ordinary macroblocks not detected to contain the skin color. This makes it more unlikely that the image quality varies along the time axis due to the above repetition.

Further, the coding section 100 permits assignment of a bitrate, in a prioritized manner, to the macroblocks near the desired image position of all the macroblocks detected to contain the skin color. This provides further improved subjective image quality of the image data to be coded, as compared to the uniform assignment of a higher bitrate to all the macroblocks detected to contain the skin color irrespective of the distance.

Figure 8:
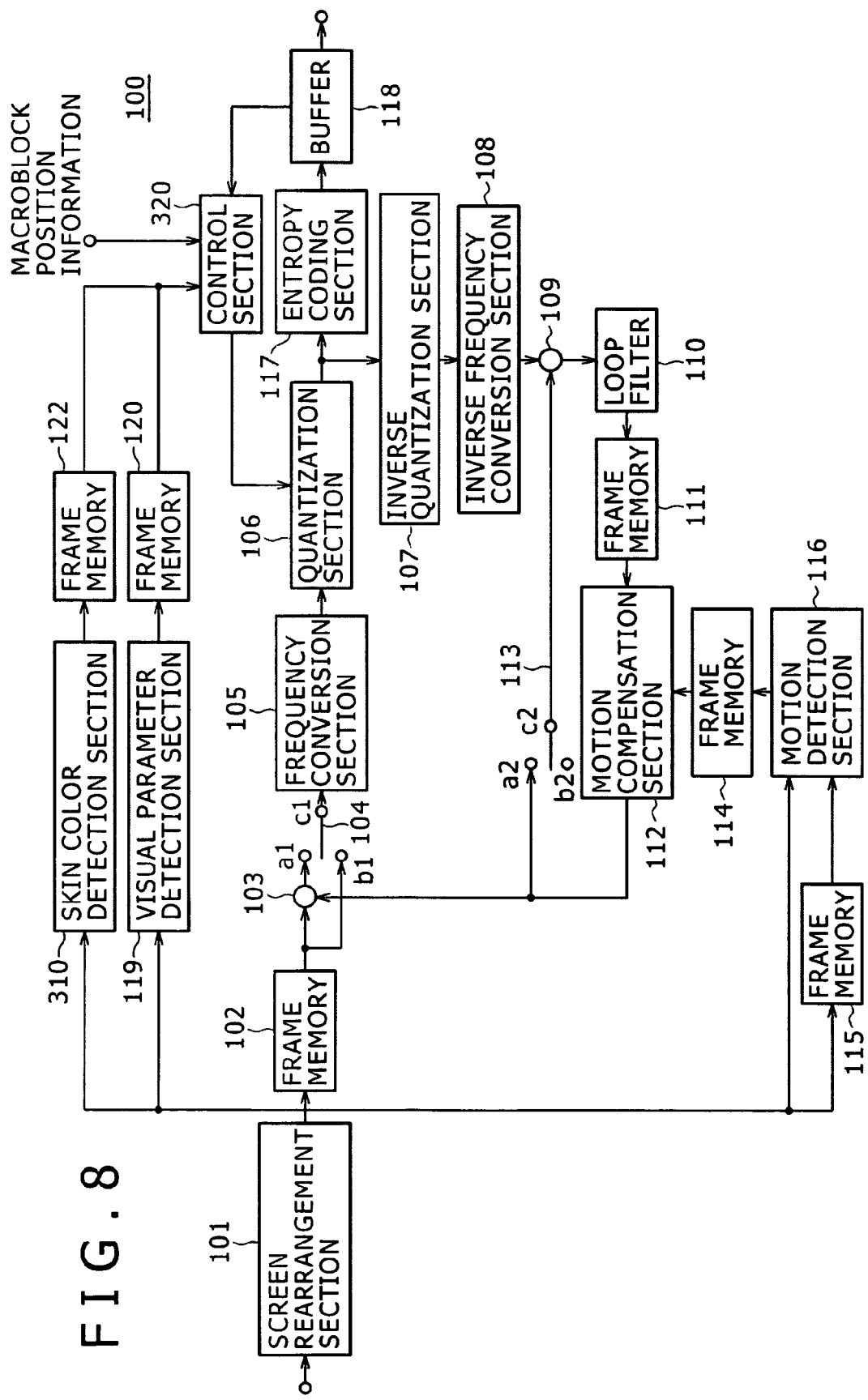
FIG. 8 is a block diagram illustrating the configuration of a coding section according to a second embodiment.

A description will be given next of the configuration and operation of a coding section 300 according to a second embodiment with reference to FIG. 8. It should be noted that the coding section 300 according to the second embodiment assigns a bitrate, in a prioritized manner, to the macroblocks detected to contain the skin color within the desired image area while at the same time further suppressing the frequency of variation in image quality along the time axis, as compared to the coding section 100 according to the first embodiment. As a result, the coding section 300 differs from the coding section 100 according to the first embodiment primarily in the operation of the skin color detection section 310 and control section 320. It should be noted that other processing blocks of the coding section 300 according to the second embodiment perform the same processes. Therefore, these blocks are denoted by like reference numerals, and the description thereof will be omitted.

Figure 9:
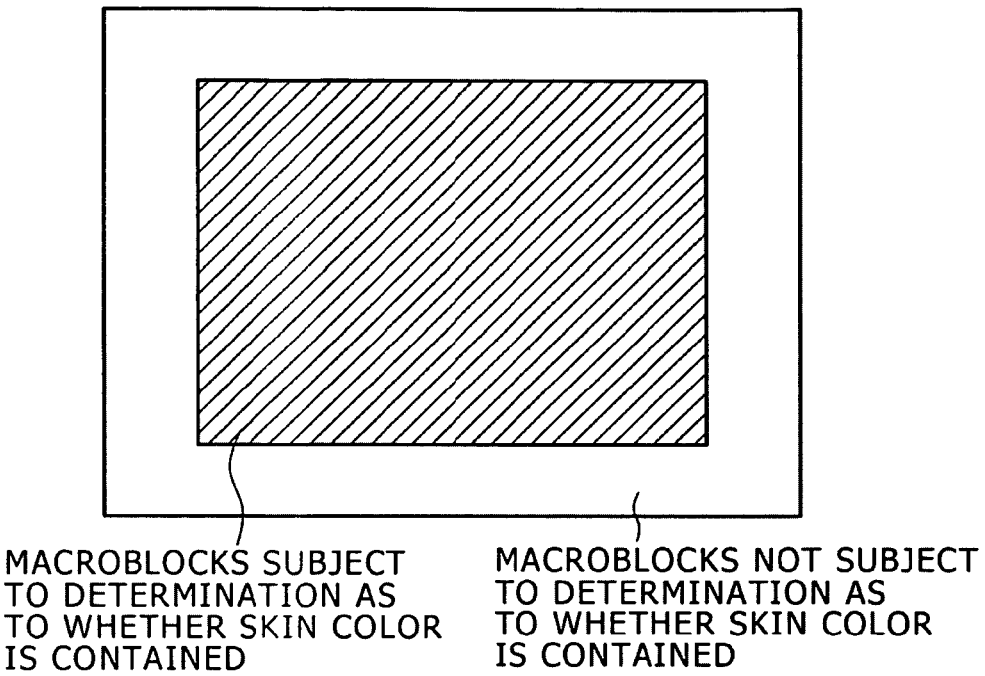
FIG. 9 is a diagram for describing the skin color detection performed by a skin color detection section.

Prior to the aforementioned skin color detection, the skin color detection section 310 determines whether each of the macroblocks is located within the given image area shown by oblique lines in FIG. 9. This image area may be set in advance or determined by an operational input from the user. The skin color detection section 310 detects the macroblocks containing the skin color from among those located within the given image area in the same manner as does the skin color detection section 121. The same section 310 supplies the detection result to the frame memory 122 as a skin color detection signal.

Thus, in the coding section 300 according to the second embodiment, the skin color detection section 310 determines whether each of the macroblocks is located within the given image area. Then, the same section 310 detects the macroblocks containing the skin color from among those located within the given image area. This provides improved subjective image quality while at the same time suppressing the frequency of variation in image quality along the time axis.

Figure 10:
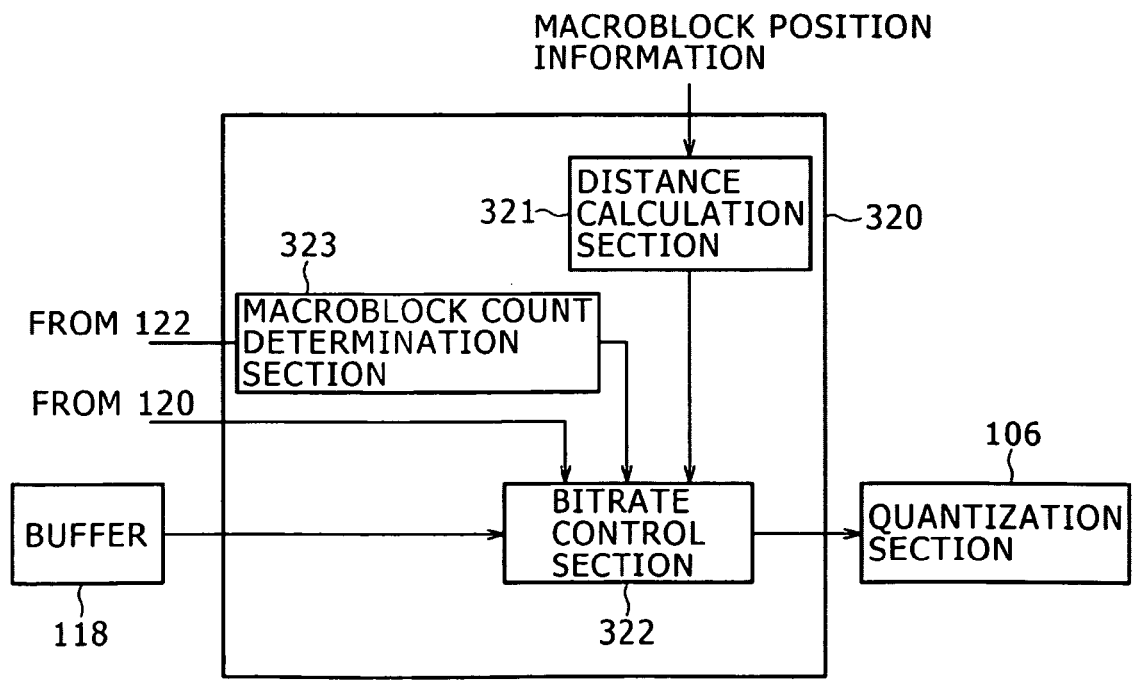
FIG. 10 is a block diagram illustrating the configuration of the control section according to the second embodiment.

The control section 320 includes a macroblock count determination section 323 in addition to a distance calculation section 321 and bitrate control section 322 as illustrated in FIG. 10. The macroblock count determination section 323 determines, on a picture-by-picture basis, whether the number of macroblocks, detected by the skin color detection section 310 to contain the given color pixel and stored in the frame memory 122, exceeds the given threshold.

In the control section 320, the bit rate control section 322 controls the quantization section 106 so that a higher bitrate is assigned to the macroblocks detected by the skin color detection section 310 to contain the skin color with decreasing distance calculated by the distance calculation section 321. A higher bitrate is assigned only when the number of detected macroblocks does not exceed the threshold as determined by the macroblock count determination section 323.

Figure 11:
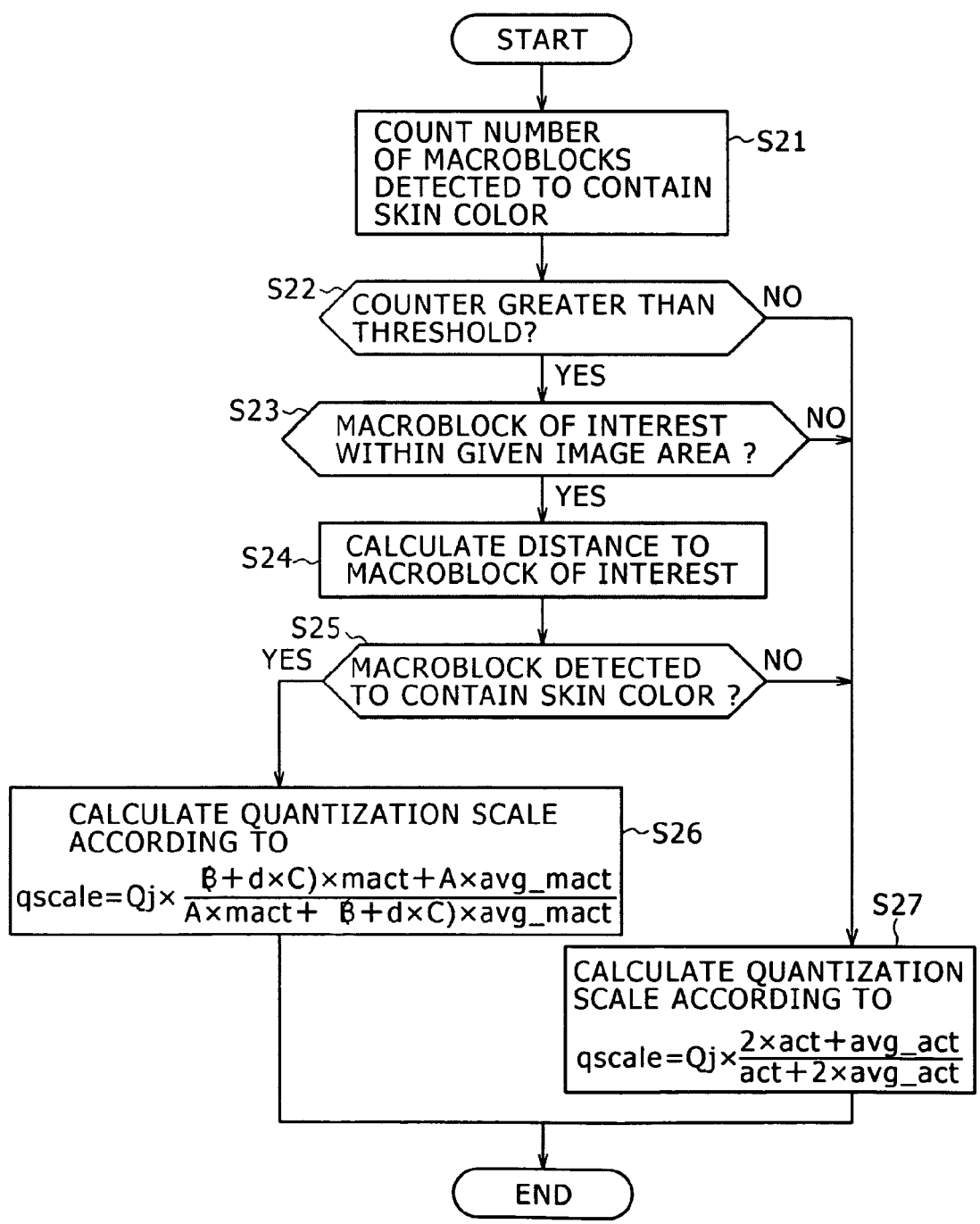
FIG. 11 is a flowchart used to describe the quantization scale calculation step performed by the control section according to the second embodiment.

A description will be given next of the calculation of the quantization scale performed by the control section 320 with reference to the flowchart in FIG. 11. It should be noted that we assume, as prerequisites for this calculation, that the distance calculation section 321 is supplied with macroblock position information, and the bitrate control section 322 with the current usage of the buffer 118, activity act of the macroblock of interest and skin color detection signal indicating whether the macroblock of interest is detected to contain the skin color.

In step S21, the macroblock count determination section 323 counts, on a picture-by-picture basis, the number of macroblocks detected by the skin color detection section 310 to contain the given color pixel and stored in the frame memory 122. Then, the process proceeds to step S22.

In step S22, the macroblock count determination section 323 determines whether the number of macroblocks detected to contain the skin color, counted in step S21, exceeds the threshold. If so, the process proceeds to step S23. If not, the process proceeds to step S27.

In step S23, the bitrate control section 322 determines, on a macroblock-by-macroblock basis and based on the macroblock position information, whether the macroblock of interest to be processed is located within the given image area illustrated in FIG. 9. If so, the process proceeds to step S24. If not, the process proceeds to step S27.

In step S24, the distance calculation section 321 calculates, based on the macroblock image position information, the distance between the given image position in the picture and the image position of the macroblock of interest to be currently processed. Then, the process proceeds to step S25.

In step S25, the bitrate control section 322 determines, according to the skin color detection signal, whether the macroblock of interest has been detected to contain the skin color. If so, the process proceeds to step S26. If not, the process proceeds to step S27.

In step S26, the bitrate control section 322 calculates the quantization scale qscale of the macroblock of interest according to formulas (7) to (9) and terminates the process.

In step S27, the bitrate control section 322 calculates the quantization scale qscale of the macroblock of interest according to formulas (4) to (6) and terminates the process.

As described above, in the coding section 300 according to the second embodiment, the skin color detection section 310 detects the macroblocks containing a skin color pixel from among those located within the given image area. In the control section 320, the bit rate control section 322 controls the quantization section 106 so that a higher bitrate is assigned to the macroblocks detected by the skin color detection section 310 to contain a skin color pixel with decreasing distance calculated by the distance calculation section 321. A higher bitrate is assigned only when the number of detected macroblocks does not exceed the threshold as determined by the macroblock count determination section 323.

In order to perform such processes, the coding section 300 according to the second embodiment assigns a bitrate, in a prioritized manner, to the macroblocks detected to contain the skin color within the desired given image area while at the same time further suppressing the frequency of variation in image quality along the time axis, primarily for the following reasons, as compared to the coding section 100 according to the first embodiment, thus providing further improved subjective image quality.

The first reason is that the variation in image quality along the time axis can be prevented by narrowing the detection area subject to skin color detection. The variation in image quality is caused by the fact that the macroblocks are detected to contain the skin color at one time and not at another time because of those macroblocks detectable to contain the skin color outside the target detection area. The second reason is that the calculation formulas for the quantization scale are selected based on whether the percentage of the skin color macroblocks among all the macroblocks in the skin color detection area is greater than the threshold. This prevents excessive degradation in image quality of the non-skin color macroblocks even if almost all macroblocks in the detection area are skin color macroblocks.

On the other hand, the above series of processes may be executed by either hardware or software. In this case, the coding section 100 according to the first embodiment or coding section 300 according to the second embodiment includes a computer 400 as illustrated in FIG. 12.

Figure 12:
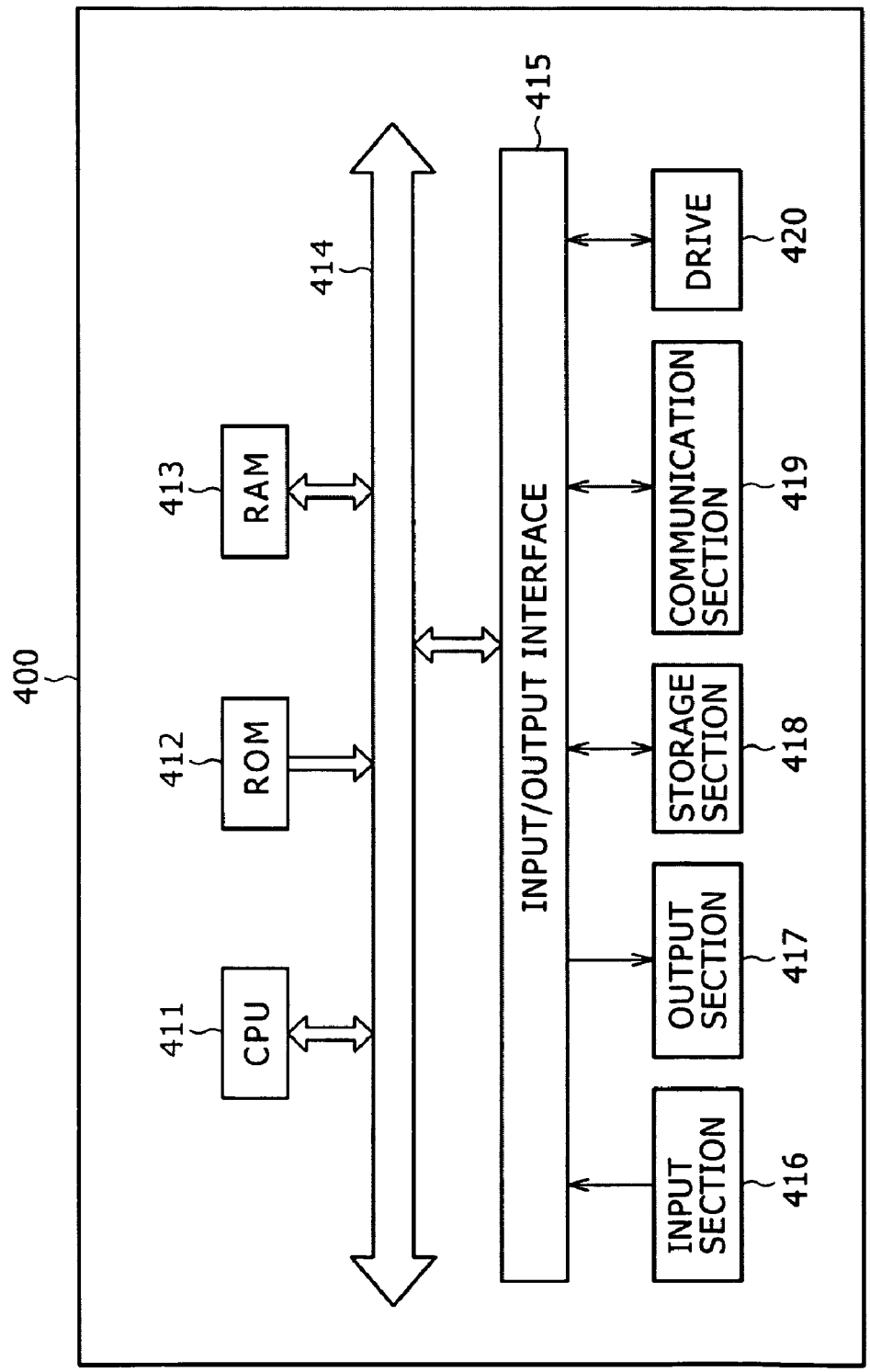
FIG. 12 is a block diagram illustrating the configuration of a computer.

In FIG. 12, a CPU (Central Processing Unit) 411 executes each of the processes according to the program stored in a ROM (Read Only Memory) 412 or loaded from a storage section 418 into a RAM (Random Access Memory) 413. The RAM 413 also stores, as appropriate, data required for the CPU 411 to execute each of the processes.

The CPU 411, ROM 412 and RAM 413 are connected with each other via a bus 414. An input/output interface 415 is also connected to the bus 414.

An input section 416, output section 417, storage section 418 and communication section 419 are connected to the input/output interface 415. The input section 416 includes a keyboard and mouse. The output section 417 includes a display and speaker. The storage section 418 includes a harddisk. The communication section 419 includes a modem and terminal adapter. The communication section 419 handles communication via networks including the Internet.

A drive 420 is also connected to the input/output interface 415 as necessary. A magnetic, optical or magneto-optical disk or semiconductor memory is loaded into the drive 420 as appropriate. The computer program read from such a disk or memory is installed into the storage section 418 as necessary.

If the series of processes are executed by software, the programs making up the software are installed as follows.

That is, the programs are installed from a network or recording medium into a computer incorporated in dedicated hardware or into a general-purpose computer which can perform various functions when installed with various programs.

It should be noted that the skin color detection sections 121 and 310 detect the macroblocks containing a skin color pixel. In the present invention, however, the target color is not limited to the skin color. Instead, the same sections 121 and 310 may detect the macroblocks containing a desired color pixel so that a coding bitrate is assigned, in a prioritized manner, to the detected macroblocks.

It should be understood by those skilled in the art that various modifications, combinations, sub-combinations and alterations may occur depending on design requirements and other factor in so far as they are within the scope of the appended claims or the equivalents thereof.

What is claimed is:

1. An image processing device for coding image data, which is divided by a given pixel count into macroblocks, on a macroblock-by-macroblock basis, the image processing device comprising:
    quantization means for quantizing image data on a macroblock-by-macroblock basis;
    detection means for detecting a macroblock containing a given color pixel from the image data; and
    control means for controlling the quantization means, the control means including distance calculation means for calculating the distance between a given image position in a picture of the image data and an image position in the macroblock detected by the detection means, and bitrate control means for controlling the quantization means so that a higher bitrate is assigned with decreasing distance calculated by the distance calculation means.

2. The image processing device of claim 1, wherein the image position is the center of the screen.

3. The image processing device of claim 2, wherein the detection means determines whether each of the macroblocks is located within a given image area in the picture so as to detect the macroblocks containing the given color pixel from among all the macroblocks located within the given image area.

4. The image processing device of claim 3, wherein the control means further comprises macroblock count determination means for determining, on a picture-by-picture basis, whether the number of macroblocks detected by the detection means exceeds a given threshold, and the macroblock count determination means controls the quantization means so that a higher bitrate is assigned to the macroblocks detected by the detection means with decreasing distance calculated by the distance calculation means only when the number of detected macroblocks does not exceed the threshold as determined by the macroblock count determination means.

5. An image processing method for coding image data, which is divided by a given pixel count into macroblocks, on a macroblock-by-macroblock basis, the image processing method comprising the steps of:
    providing a digital signal processor comprising a compression/decompression section configured to perform the steps of:
        detecting a macroblock containing a given color pixel from the image data;
        calculating the distance between a given image position in a picture of the image data and an image position in the macroblock detected by the detection step; and
        controlling the quantization of the image data so that a higher bitrate is assigned with decreasing distance calculated by the distance calculation step.

6. The image processing device of claim 1 further comprising imaging means for obtaining image data, wherein the quantization means quantize the image data obtained by the imaging means.

7. An image processing device for coding image data, which is divided by a given pixel count into macroblocks, on a macroblock-by-macroblock basis, the image processing device comprising:
    a quantization section configured to quantize image data on a macroblock-by-macroblock basis;
    a detection section configured to detect a macroblock containing a given color pixel from the image data; and
    a control section configured to control the quantization section, the control section including a distance calculation section configured to calculate the distance between a given image position in a picture of the image data and an image position in the macroblock detected by the detection section, and a bitrate control section configured to control the quantization section so that a higher bitrate is assigned with decreasing distance calculated by the distance calculation section.

* * * * *